United States Patent
Zhang et al.

(10) Patent No.: US 8,887,034 B2
(45) Date of Patent: Nov. 11, 2014

(54) SYSTEMS AND METHODS FOR SHORT MEDIA DEFECT DETECTION

(75) Inventors: Fan Zhang, Milpitas, CA (US); Shaohua Yang, San Jose, CA (US)

(73) Assignee: LSI Corporation, San Jose, CA (US)

( * ) Notice: Subject to any disclaimer, the term of this patent is extended or adjusted under 35 U.S.C. 154(b) by 473 days.

(21) Appl. No.: 13/088,119

(22) Filed: Apr. 15, 2011

(65) Prior Publication Data

US 2012/0266055 A1    Oct. 18, 2012

(51) Int. Cl.
*G06F 7/02*     (2006.01)
*H03M 13/00*    (2006.01)
*G06F 11/07*    (2006.01)

(52) U.S. Cl.
CPC ................... *G06F 11/0754* (2013.01)
USPC .......................................................... 714/819

(58) Field of Classification Search
CPC ....... G06F 11/10; G06F 7/02; G06F 11/0751; G06F 11/07; G06F 11/079; G06F 11/0766; G06F 11/08; H05K 999/99; H04L 1/061
See application file for complete search history.

(56) References Cited

U.S. PATENT DOCUMENTS

| | | | |
|---|---|---|---|
| 5,278,703 A | 1/1994 | Rub | |
| 5,278,846 A | 1/1994 | Okayama et al. | |
| 5,325,402 A | 6/1994 | Ushirokawa | |
| 5,392,299 A | 2/1995 | Rhines et al. | |
| 5,471,500 A | 11/1995 | Blaker et al. | |
| 5,513,192 A | 4/1996 | Janku et al. | |
| 5,523,903 A | 6/1996 | Hetzler | |
| 5,550,870 A | 8/1996 | Blaker et al. | |
| 5,612,964 A | 3/1997 | Haraszti | |
| 5,701,314 A | 12/1997 | Armstrong et al. | |
| 5,710,784 A | 1/1998 | Kindred et al. | |
| 5,712,861 A | 1/1998 | Inoue et al. | |
| 5,717,706 A | 2/1998 | Ikeda | |
| 5,768,044 A | 6/1998 | Hetzler | |
| 5,802,118 A | 9/1998 | Bliss et al. | |
| 5,844,945 A | 12/1998 | Nam et al. | |
| 5,898,710 A | 4/1999 | Amrany | |
| 5,923,713 A | 7/1999 | Hatakeyama | |

(Continued)

FOREIGN PATENT DOCUMENTS

| EP | 0522578 | 1/1993 |
|---|---|---|
| EP | 0631277 | 12/1994 |

(Continued)

OTHER PUBLICATIONS

U.S. Appl. No. 11/461,026, filed Jul. 31, 2006, Tan, Weijun.

(Continued)

*Primary Examiner* — Albert Decady
*Assistant Examiner* — Enamul M Kabir
(74) *Attorney, Agent, or Firm* — Hamilton DeSanctis & Cha

(57) ABSTRACT

Various embodiments of the present invention provide systems and methods for media defect detection. As an example, a data processing circuit is disclosed that includes a defect detector circuit and a comparator circuit. The defect detector circuit is operable to calculate a correlation value combining at least three of a data input derived from a medium, a detector extrinsic output, a detector intrinsic output and a decoder output. The comparator circuit is operable to compare the correlation value to a threshold value and to assert a media defect indicator when the correlation value is less than the threshold value.

20 Claims, 7 Drawing Sheets

(56) References Cited

U.S. PATENT DOCUMENTS

| | | | |
|---|---|---|---|
| 5,978,414 | A | 11/1999 | Nara |
| 5,983,383 | A | 11/1999 | Wolf |
| 6,005,897 | A | 12/1999 | McCallister et al. |
| 6,023,783 | A | 2/2000 | Divsalar et al. |
| 6,029,264 | A | 2/2000 | Kobayashi et al. |
| 6,041,432 | A | 3/2000 | Ikeda |
| 6,065,149 | A | 5/2000 | Yamanaka |
| 6,097,764 | A | 8/2000 | McCallister et al. |
| 6,145,110 | A | 11/2000 | Khayrallah |
| 6,216,249 | B1 | 4/2001 | Bliss et al. |
| 6,216,251 | B1 | 4/2001 | McGinn |
| 6,229,467 | B1 | 5/2001 | Eklund et al. |
| 6,266,795 | B1 | 7/2001 | Wei |
| 6,317,472 | B1 | 11/2001 | Choi et al. |
| 6,351,832 | B1 | 2/2002 | Wei |
| 6,377,610 | B1 | 4/2002 | Hagenauer et al. |
| 6,381,726 | B1 | 4/2002 | Weng |
| 6,438,717 | B1 | 8/2002 | Butler et al. |
| 6,473,878 | B1 | 10/2002 | Wei |
| 6,476,989 | B1 | 11/2002 | Chainer et al. |
| 6,625,775 | B1 | 9/2003 | Kim |
| 6,657,803 | B1 | 12/2003 | Ling et al. |
| 6,671,404 | B1 | 12/2003 | Kawatani et al. |
| 6,748,034 | B2 | 6/2004 | Hattori et al. |
| 6,757,862 | B1 | 6/2004 | Marianetti |
| 6,785,863 | B2 | 8/2004 | Blankenship et al. |
| 6,788,654 | B1 | 9/2004 | Hashimoto et al. |
| 6,810,502 | B2 | 10/2004 | Eidson |
| 6,980,382 | B2 | 12/2005 | Hirano et al. |
| 6,986,098 | B2 | 1/2006 | Poeppelman |
| 7,010,051 | B2 | 3/2006 | Murayama et al. |
| 7,047,474 | B2 | 5/2006 | Rhee et al. |
| 7,058,873 | B2 | 6/2006 | Song et al. |
| 7,073,118 | B2 | 7/2006 | Greeberg et al. |
| 7,093,179 | B2 | 8/2006 | Shea |
| 7,113,356 | B1 | 9/2006 | Wu |
| 7,136,244 | B1 | 11/2006 | Rothbert |
| 7,173,783 | B1 | 2/2007 | McEwen et al. |
| 7,184,486 | B1 | 2/2007 | Wu et al. |
| 7,191,378 | B2 | 3/2007 | Eroz et al. |
| 7,203,015 | B2 | 4/2007 | Sakai et al. |
| 7,203,887 | B2 | 4/2007 | Eroz et al. |
| 7,236,757 | B2 | 6/2007 | Raghaven et al. |
| 7,257,764 | B2 | 8/2007 | Suzuki et al. |
| 7,310,768 | B2 | 12/2007 | Eidson et al. |
| 7,313,750 | B1 | 12/2007 | Feng et al. |
| 7,370,258 | B2 | 5/2008 | Iancu et al. |
| 7,403,752 | B2 | 7/2008 | Raghaven et al. |
| 7,430,256 | B2 | 9/2008 | Zhidkov |
| 7,502,189 | B2 | 3/2009 | Sawaguchi et al. |
| 7,505,537 | B1 | 3/2009 | Sutardja |
| 7,523,375 | B2 | 4/2009 | Spencer |
| 7,587,657 | B2 | 9/2009 | Haratsch |
| 7,590,168 | B2 | 9/2009 | Raghaven et al. |
| 7,590,927 | B1 | 9/2009 | Shih et al. |
| 7,702,989 | B2 | 4/2010 | Graef et al. |
| 7,712,008 | B2 | 5/2010 | Song et al. |
| 7,738,201 | B2 | 6/2010 | Jin et al. |
| 7,752,523 | B1 | 7/2010 | Chaichanavong |
| 7,801,200 | B2 | 9/2010 | Tan |
| 7,802,163 | B2 | 9/2010 | Tan |
| 2003/0063405 | A1 | 4/2003 | Jin et al. |
| 2003/0066020 | A1* | 4/2003 | Morita et al. ............ 714/794 |
| 2003/0081693 | A1 | 5/2003 | Raghaven et al. |
| 2003/0087634 | A1 | 5/2003 | Raghaven et al. |
| 2003/0112896 | A1 | 6/2003 | Raghaven et al. |
| 2003/0134607 | A1 | 7/2003 | Raghaven et al. |
| 2004/0071206 | A1 | 4/2004 | Takatsu |
| 2004/0098659 | A1 | 5/2004 | Bjerke et al. |
| 2005/0010855 | A1 | 1/2005 | Lusky |
| 2005/0078399 | A1 | 4/2005 | Fung |
| 2005/0111540 | A1 | 5/2005 | Modrie et al. |
| 2005/0157780 | A1 | 7/2005 | Werner et al. |
| 2005/0195749 | A1 | 9/2005 | Elmasry et al. |
| 2005/0216819 | A1 | 9/2005 | Chugg et al. |
| 2005/0273688 | A1 | 12/2005 | Argon |
| 2006/0020872 | A1 | 1/2006 | Richardson et al. |
| 2006/0031737 | A1 | 2/2006 | Chugg et al. |
| 2006/0123285 | A1 | 6/2006 | De Araujo et al. |
| 2006/0140311 | A1 | 6/2006 | Ashley et al. |
| 2006/0168493 | A1 | 7/2006 | Song et al. |
| 2006/0195772 | A1 | 8/2006 | Graef et al. |
| 2006/0210002 | A1 | 9/2006 | Yang et al. |
| 2006/0248435 | A1 | 11/2006 | Haratsch |
| 2006/0256670 | A1 | 11/2006 | Park et al. |
| 2007/0011569 | A1 | 1/2007 | Casado et al. |
| 2007/0047121 | A1 | 3/2007 | Elefeheriou et al. |
| 2007/0047635 | A1 | 3/2007 | Stojanovic et al. |
| 2007/0110200 | A1 | 5/2007 | Mergen et al. |
| 2007/0162838 | A1* | 7/2007 | Esumi et al. ............ 714/800 |
| 2007/0230407 | A1 | 10/2007 | Petrie et al. |
| 2007/0286270 | A1 | 12/2007 | Huang et al. |
| 2008/0043356 | A1* | 2/2008 | Jin et al. ............ 360/39 |
| 2008/0049825 | A1 | 2/2008 | Chen et al. |
| 2008/0055122 | A1 | 3/2008 | Tan |
| 2008/0065970 | A1 | 3/2008 | Tan |
| 2008/0069373 | A1 | 3/2008 | Jiang et al. |
| 2008/0104486 | A1* | 5/2008 | Kanaoka ............ 714/780 |
| 2008/0168330 | A1 | 7/2008 | Graef et al. |
| 2008/0276156 | A1 | 11/2008 | Gunnam |
| 2008/0301521 | A1 | 12/2008 | Gunnam |
| 2009/0185643 | A1 | 7/2009 | Fitzpatrick |
| 2009/0199071 | A1 | 8/2009 | Graef |
| 2009/0199073 | A1* | 8/2009 | Kanaoka et al. ............ 714/758 |
| 2009/0235116 | A1* | 9/2009 | Tan et al. ............ 714/15 |
| 2009/0235146 | A1* | 9/2009 | Tan et al. ............ 714/780 |
| 2009/0259915 | A1 | 10/2009 | Livshitz et al. |
| 2009/0268848 | A1* | 10/2009 | Tan et al. ............ 375/316 |
| 2009/0271670 | A1* | 10/2009 | Tan et al. ............ 714/719 |
| 2009/0273492 | A1 | 11/2009 | Yang et al. |
| 2009/0274247 | A1 | 11/2009 | Galbraith et al. |
| 2010/0002795 | A1 | 1/2010 | Raghaven et al. |
| 2010/0042877 | A1* | 2/2010 | Tan ............ 714/704 |
| 2010/0042890 | A1 | 2/2010 | Gunnam |
| 2010/0050043 | A1 | 2/2010 | Savin |
| 2010/0061492 | A1 | 3/2010 | Noeldner |
| 2010/0070837 | A1 | 3/2010 | Xu et al. |
| 2010/0164764 | A1 | 7/2010 | Nayak |
| 2010/0185914 | A1 | 7/2010 | Tan et al. |
| 2010/0226033 | A1* | 9/2010 | Tan et al. ............ 360/53 |
| 2010/0269023 | A1* | 10/2010 | Yang et al. ............ 714/769 |
| 2011/0075569 | A1 | 3/2011 | Marrow et al. |
| 2011/0080211 | A1 | 4/2011 | Yang et al. |
| 2011/0167246 | A1 | 7/2011 | Yang et al. |
| 2012/0047396 | A1* | 2/2012 | Garani et al. ............ 714/6.12 |

FOREIGN PATENT DOCUMENTS

| | | |
|---|---|---|
| EP | 1814108 | 8/2007 |
| WO | WO 2006/016751 | 2/2006 |
| WO | WO 2006/134527 | 12/2006 |
| WO | WO 2007/091797 | 8/2007 |
| WO | WO 2010/126482 | 4/2010 |
| WO | WO 2010/101578 | 9/2010 |

OTHER PUBLICATIONS

U.S. Appl. No. 11/461,198, filed Jul. 31, 2006, Tan, Weijun.
U.S. Appl. No. 11/461,283, filed Jul. 31, 2006, Tan, Weijun.
U.S. Appl. No. 12/540,283, filed Aug. 12, 2009, Liu, et al.
U.S. Appl. No. 12/652,201, filed Jan. 5, 2010, Mathew, et al.
U.S. Appl. No. 12/763,050, filed Apr. 19, 2010, Ivkovic, et al.
U.S. Appl. No. 12/792,555, filed Jun. 2, 2010, Liu, et al.
U.S. Appl. No. 12/887,317, filed Sep. 21, 2010, Xia, et al.
U.S. Appl. No. 12/887,330, filed Sep. 21, 2010, Zhang, et al.
U.S. Appl. No. 12/887,369, filed Sep. 21, 2010, Liu, et al.
U.S. Appl. No. 12/901,816, filed Oct. 11, 2010, Li, et al.
U.S. Appl. No. 12/901,742, filed Oct. 11, 2010, Yang.
U.S. Appl. No. 12/917,756, filed Nov. 2, 2010, Miladinovic, et al.
U.S. Appl. No. 12/947,931, filed Nov. 17, 2010, Yang, Shaohua.
U.S. Appl. No. 12/947,947, filed Nov. 17, 2010, Ivkovic, et al.
U.S. Appl. No. 12/972,942, filed Dec. 20, 2010, Liao, et al.
U.S. Appl. No. 12/992,948, filed Nov. 16, 2010, Yang, et al.

(56) References Cited

OTHER PUBLICATIONS

U.S. Appl. No. 13/021,814, filed Feb. 7, 2011, Jin, Ming, et al.
U.S. Appl. No. 13/031,818, filed Feb. 22, 2011, Xu, Changyou, et al.
U.S. Appl. No. 13/050,129, filed Mar. 17, 2011, Tan, et al.
U.S. Appl. No. 13/050,765, filed Mar. 17, 2011, Yang, et al.
U.S. Appl. No. 13/088,119, filed Apr. 15, 2011, Zhang, et al.
U.S. Appl. No. 13/088,146, filed Apr. 15, 2011, Li, et al.
U.S. Appl. No. 13/088,178, filed Apr. 15, 2011, Sun, et al.
U.S. Appl. No. 13/126,748, filed Apr. 28, 2011, Tan.
U.S. Appl. No. 13/167,764, filed Jun. 24, 2011, Li, Zongwang, et al.
U.S. Appl. No. 13/167,771, filed Jun. 24, 2011, Li, Zongwang, et al.
U.S. Appl. No. 13/167,775, filed Jun. 24, 2011, Li, Zongwang.
U.S. Appl. No. 13/186,146, filed Jul. 19, 2011, Mathew, et al.
U.S. Appl. No. 13/186,213, filed Jul. 19, 2011, Mathew, et al.
U.S. Appl. No. 13/186,234, filed Jul. 19, 2011, Xia, Haitao, et al.
U.S. Appl. No. 13/186,251, filed Jul. 19, 2011, Xia, Haitao, et al.
U.S. Appl. No. 13/186,174, filed Jul. 19, 2011, Mathew, et al.
U.S. Appl. No. 13/186,197, filed Jul. 19, 2011, Mathew, George et al.
U.S. Appl. No. 13/213,751, filed Aug. 19, 2011, Zhang, Fan, et al.
U.S. Appl. No. 13/213,808, filed Aug. 19, 2011, Jin, Ming.
U.S. Appl. No. 13/220,142, filed Aug. 29, 2011, Chang, Wu, et al.
U.S. Appl. No. 13/227,538, filed Sep. 8, 2011, Yang, Shaohua, et al.
U.S. Appl. No. 13/227,544, filed Sep. 8, 2011, Yang, Shaohua, et al.
U.S. Appl. No. 13/239,683, filed Sep. 22, 2011, Xu, Changyou.
U.S. Appl. No. 13/239,719, filed Sep. 22, 2011, Xia, Haitao, et al.
U.S. Appl. No. 13/251,342, filed Oct. 2, 2011, Xia, Haitao, et al.
U.S. Appl. No. 13/269,832, filed Oct. 10, 2011, Xia, Haitao, et al.
U.S. Appl. No. 13/269,852, filed Oct. 10, 2011, Xia, Haitao, et al.
U.S. Appl. No. 13/284,819, filed Oct. 28, 2011, Tan, Weijun, et al.
U.S. Appl. No. 13/284,730, filed Oct. 28, 2011, Zhang, Fan, et al.
U.S. Appl. No. 13/284,754, filed Oct. 28, 2011, Zhang, Fan, et al.
U.S. Appl. No. 13/284,767, filed Oct. 28, 2011, Zhang, Fan, et al.
U.S. Appl. No. 13/284,826, filed Oct. 28, 2011, Tan, Weijun, et al.
U.S. Appl. No. 13/295,150, filed Nov. 14, 2011, Li, Zongwang, et al.
U.S. Appl. No. 13/295,160, filed Nov. 14, 2011, Li, Zongwang, et al.
U.S. Appl. No. 13/251,340, filed Oct. 3, 2011, Xia, Haitao, et al.
Amer et al "Design Issues for a Shingled Write Disk System" MSST IEEE 26th Symposium May 2010.
Bahl, et al "Optimal decoding of linear codes for Minimizing symbol error rate", IEEE Trans. Inform. Theory, vol. 20, pp. 284-287, Mar. 1974.
Casado et al., Multiple-rate low-denstiy parity-check codes with constant blocklength, IEEE Transations on communications, Jan. 2009, vol. 57, pp. 75-83.
Collins and Hizlan, "Determinate State Convolutional Codes" IEEE Transactions on Communications, Dec. 1993.
Eleftheriou, E. et al., "Low Density Parity-Check Codes for Digital Subscriber Lines", Proc ICC 2002, pp. 1752-1757.
Fisher, R et al., "Adaptive Thresholding"[online] 2003 [retrieved on May 28, 2010] Retrieved from the Internet <URL:http://homepages.inf.ed.ac.uk/rbf/HIPR2/adpthrsh.htm.
Fossnorier, Marc P.C. "Quasi-Cyclic Low-Density Parity-Check Codes From Circulant Permutation Maricies" IEEE Transactions on Information Theory, vol. 50, No. 8 Aug. 8, 2004.
Gibson et al "Directions for Shingled-Write and Two-Dimensional Magnetic Recording System" Architectures: Synergies with Solid-State Disks Carnegie Mellon Univ. May 1, 2009.
K. Gunnam et al., "Next Generation iterative LDPC solutions for magnetic recording storage", invited paper. The Asilomar Conference on Signals, Systems, and Computers, Nov. 2008.
K. Gunnam et al., "Value-Reuse Properties of Min-Sum for GF(q)" (dated Oct. 2006) Dept. of ECE, Texas A&M University Technical Note, published about Aug. 2010.
K. Gunnam et al., "Value-Reuse Properties of Min-Sum for GF(q)"(dated Jul. 2008) Dept. of ECE, Texas A&M University Technical Note, published about Aug. 2010.
K. Gunnam "Area and Energy Efficient VLSI Architectures for Low-Density Parity-Check Decoders Using an On-The-Fly Computation" dissertation at Texas A&M University, Dec. 2006.
Han and Ryan, "Pinning Techniques for Low-Floor Detection/Decoding of LDPC-Coded Partial Response Channels", 5th International Symposium on Turbo Codes &Related Topics, 2008.
Hagenauer, J. et al A Viterbi Algorithm with Soft-Decision Outputs and its Applications in Proc. IEEE Globecom, pp. 47. 11-47 Dallas, TX Nov. 1989.
Lee et al., "Partial Zero-Forcing Adaptive MMSE Receiver for DS-CDMA Uplink in Multicell Environments" IEEE Transactions on Vehicular Tech. vol. 51, No. 5, Sep. 2002.
Lin et al "An efficient VLSI Architecture for non binary LDPC decoders"—IEEE Transaction on Circuits and Systems II vol. 57, Issue 1 (Jan. 2010) pp. 51-55.
Mohsenin et al., "Split Row: A Reduced Complexity, High Throughput LDPC Decoder Architecture", pp. 1-6, printed from www.ece.ucdavis.edu on Jul. 9, 2007.
Moon et al, "Pattern-dependent noise prediction in signal-dependent Noise," IEEE JSAC, vol. 19, No. 4 pp. 730-743, Apr. 2001.
Perisa et al "Frequency Offset Estimation Based on Phase Offsets Between Sample Correlations" Dept. of Info. Tech. University of Ulm 2005.
Sari H et al., "Transmission Techniques for Digital Terrestrial TV Broadcasting" IEEE Communications Magazine, IEEE Service Center Ny, NY vol. 33, No. 2 Feb. 1995.
Selvarathinam, A.: "Low Density Parity-Check Decoder Architecture for High Throughput Optical Fiber Channels" IEEE International Conference on Computer Design (ICCD '03) 2003.
Shu Lin, Ryan, "Channel Codes, Classical and Modern" 2009, Cambridge University Press, pp. 213-222.
Landini G, "Auto threshold and Auto Local Threshold" [online] [retrieved May 28, 2010] Retrieved from the Internet: <URL:http://www.dentistry.bham.ac.uk/landinig/software/autothreshold/autoreshold.html.
Vasic, B., "High-Rate Low-Density Parity-Check Codes Based on Anti-Pasch Affine Geometries," Proc ICC 2002, pp. 1332-1336.
Vasic, B., "High-Rate Girth-Eight Codes on Rectangular Integer Lattices", IEEE Trans. Communications, vol. 52, Aug. 2004, pp. 1248-1252.
Wang Y et al., "A Soft Decision Decoding Scheme for Wireless COFDM With Application to DVB-T" IEEE Trans. on Consumer elec., IEEE Service Center, NY,NY vo. 50, No. 1 Feb. 2004.
Weon-Cheol Lee et al., "Vitierbi Decoding Method Using Channel State Info. in COFDM System" IEEE Trans. on Consumer Elect., IEEE Service Center, NY, NY vol. 45, No. 3 Aug. 1999.
Xia et al, "A Chase-GMD algorithm of Reed-Solomon codes on perpendicular channels", IEEE Transactions on Magnetics, vol. 42 pp. 2603-2605, Oct. 2006.
Xia et al, "Reliability-based Reed-Solomon decoding for magnetic recording channels", IEEE International Conference on Communication pp. 1977-1981, May 2008.
Yeo et al., "VLSI Architecture for Iterative Decoders in Magnetic Storage Channels", Mar. 2001, pp. 748-755, IEEE trans. Magnetics, vol. 37, No. 2.
Youn, et al. "BER Perform. Due to Irrreg. of Row-Weight Distrib. of the Parity-Chk. Matirx in Irreg. LDPC Codes for 10-Gb/s Opt. Signls" Jrnl of Lightwave Tech., vol. 23, Sep. 2005.
Zhong et al., "Area-Efficient Min-Sum Decoder VLSI Architecture for High-Rate QC-LDPC Codes in Magnetic Recording", pp. 1-15, Submitted 2006, not yet published.
Zhong, "Block-LDPC: A Practical LDPC Coding System Design Approach", IEEE Trans. on Circuits, Regular Papers, vol. 5, No. 4, pp. 766-775, Apr. 2005.
Zhong et al., "Design of VLSI Implementation-Oriented LDPC Codes", IEEE, pp. 670-673, 2003.
Zhong et al., "High-Rate Quasi-Cyclic LDPC Codes for Magnetic Recording Channel with Low Error Floor", ISCAS, IEEE pp. 3546-3549, May 2006.

(56) References Cited

OTHER PUBLICATIONS

Zhong et al., "Iterative MAX-LOG-MAP and LDPC Detector/Decoder Hardware Implementation for Magnetic Read Channel", SRC Techron, pp. 1-4, Oct. 2005.

Zhong et al., "Joint Code-Encoder Design for LDPC Coding System VLSI Implementation", ISCAS, IEEE pp. 389-392, May 2004.

Zhong et al., "Quasi Cyclic LDPC Codes for the Magnetic Recording Channel: Code Design and VSLI Implementation", IEEE Transactions on Magnetics, v. 43, pp. 1118-1123, Mar. 2007.

Zhong, "VLSI Architecture of LDPC Based Signal Detection and Coding System for Magnetic Recording Channel", Thesis, RPI, Troy, NY, pp. 1-95, May 2006.

\* cited by examiner

SYSTEMS AND METHODS FOR SHORT MEDIA DEFECT DETECTION

BACKGROUND OF THE INVENTION

The present inventions are related to systems and methods for transferring information, and more particularly to systems and methods for determining problems related to a medium associated with a data transfer.

Various data transfer systems have been developed including storage systems, cellular telephone systems, radio transmission systems. In each of the systems data is transferred from a sender to a receiver via some medium. For example, in a storage system, data is sent from a sender (i.e., a write function) to a receiver (i.e., a read function) via a storage medium. The effectiveness of any transfer is impacted by any defects associated with the transfer medium. In some cases, data loss caused by defects in the transfer medium can make recovery of data from the transfer medium difficult even for data received from non-defective areas or times. Various approaches have been developed for identifying defects in the transfer medium. Such approaches provide a general ability to identify defects, but in many cases are inaccurate. In the best case, this inaccuracy limits the effectiveness of any defect identification. In the worst case, inaccurate defect detection may actually hamper the data recovery process.

Hence, for at least the aforementioned reasons, there exists a need in the art for advanced systems and methods for defect detection.

BRIEF SUMMARY OF THE INVENTION

The present inventions are related to systems and methods for transferring information, and more particularly to systems and methods for determining problems related to a medium associated with a data transfer.

Some embodiments of the present invention provide data processing circuits that include a defect detector circuit and a comparator circuit. The defect detector circuit is operable to calculate a correlation value combining at least three of a data input derived from a medium, a detector extrinsic output, a detector intrinsic output and a decoder output. The comparator circuit is operable to compare the correlation value to a threshold value and to assert a media defect indicator when the correlation value is less than the threshold value. In some instances of the aforementioned embodiments, the data processing circuit further includes a data detector circuit operable to apply a data detection algorithm to the data input and a derivative of the decoder output to yield the detector intrinsic output and the detector extrinsic output. In some such instances, the data processing circuit further includes a scaling circuit operable to multiply the media defect indicator by the decoder output to yield the derivative of the decoder output. In various instances of the aforementioned embodiments, the data processing circuit further includes a data decoder circuit operable to apply a data decoding algorithm to the detector extrinsic output to yield the decoder output.

Various embodiments of the present invention provide methods for detecting media defects. The methods include receiving a data input, a detector extrinsic output, a detector intrinsic output, and a decoder output. At least three of the data input, the detector extrinsic output, the detector intrinsic output, and the decoder output are correlated to yield a correlation value. The method further includes asserting a media defect indicator based at least in part on the correlation value. In some instances of the aforementioned embodiments, the methods further include comparing the correlation value with a threshold level. In such instance, the media defect indicator is asserted when the correlation value is less than the threshold value. In some cases, the threshold value is programmable.

In various instances of the aforementioned embodiments, correlating at least three of the data input, the detector extrinsic output, the detector intrinsic output and the decoder output to yield the correlation value includes correlating all of the data input, the detector extrinsic output, the detector intrinsic output and the decoder output to yield the correlation value. In some such instances, such correlation includes: calculating a first preliminary value based on the detector intrinsic output and the data input; calculating a second preliminary value based on the detector extrinsic output and the decoder output; and summing the first preliminary value and the second preliminary value to yield the correlation value.

In some instance of the aforementioned embodiments, the methods further include performing a data detection on the data input and a derivative of the decoder output to yield the detector intrinsic output and the detector extrinsic output. In some such instances, the methods further include multiplying the decoder output by the media defect indicator to yield the derivative of the decoder output. In one or more instances of the aforementioned embodiments, the methods further include performing a data decode of the detector extrinsic output to yield the decoder output.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for transferring information, and more particularly to systems and methods for determining problems related to a medium associated with a data transfer.

Figure 1:
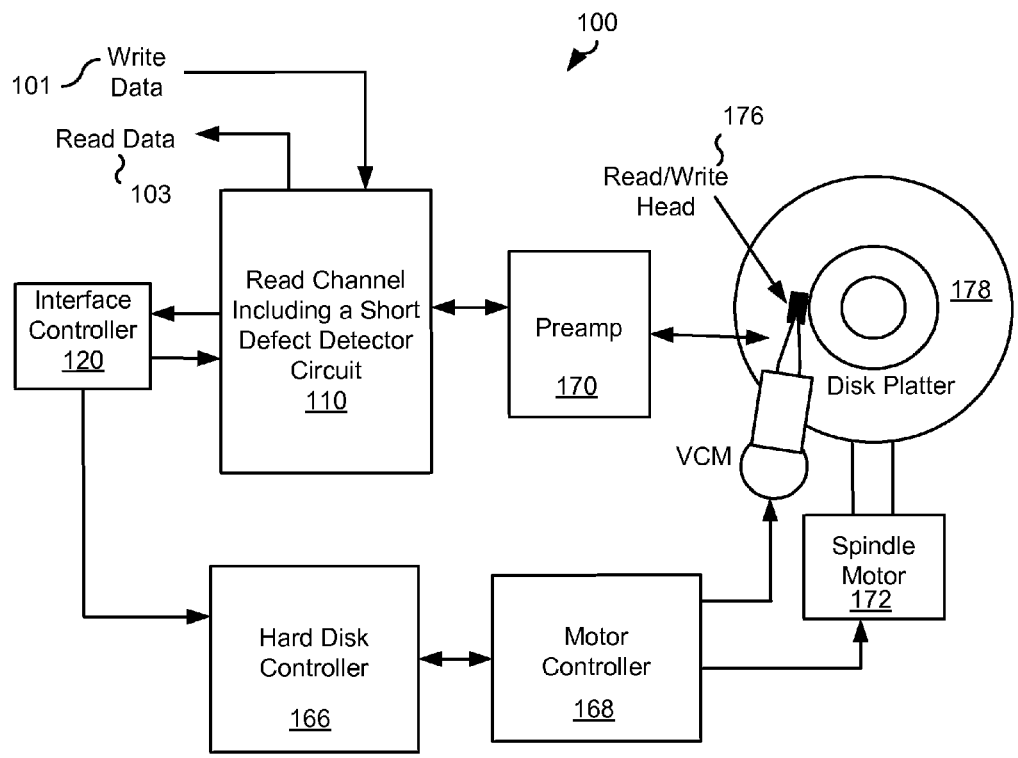
FIG. 1 shows a storage system including a read channel with a short defect detector circuit in accordance with various embodiments of the present invention.

Turning to FIG. 1, a storage system 100 including a read channel circuit 110 with a short defect detector circuit in accordance with various embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head 176. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In a typical read operation, read/write head assembly 176 is accurately positioned by motor controller 168 over a desired data track on disk platter 178. Motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). Once read/write head assembly 176 is positioned adjacent the proper data track, magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is transferred from read/write head assembly 176 to read channel 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103 to a receiving circuit. As part of processing the received information, read channel circuit 110 performs a media defect detection process using the short defect detector circuit. Such a short defect detector circuit may be implemented similar to, but are not limited to, any of those described below in relation to FIGS. 2-4, and/or may operate similar to, but is not limited to, the method discussed below in relation to FIGS. 5a-5c. A write operation is substantially the opposite of the preceding read operation with write data 101 being provided to read channel circuit 110. This data is then encoded and written to disk platter 178.

It should be noted that storage system 100 may be integrated into a larger storage system such as, for example, a RAID (redundant array of inexpensive disks or redundant array of independent disks) based storage system. It should also be noted that various functions or blocks of storage system 100 may be implemented in either software or firmware, while other functions or blocks are implemented in hardware.

Figure 2:
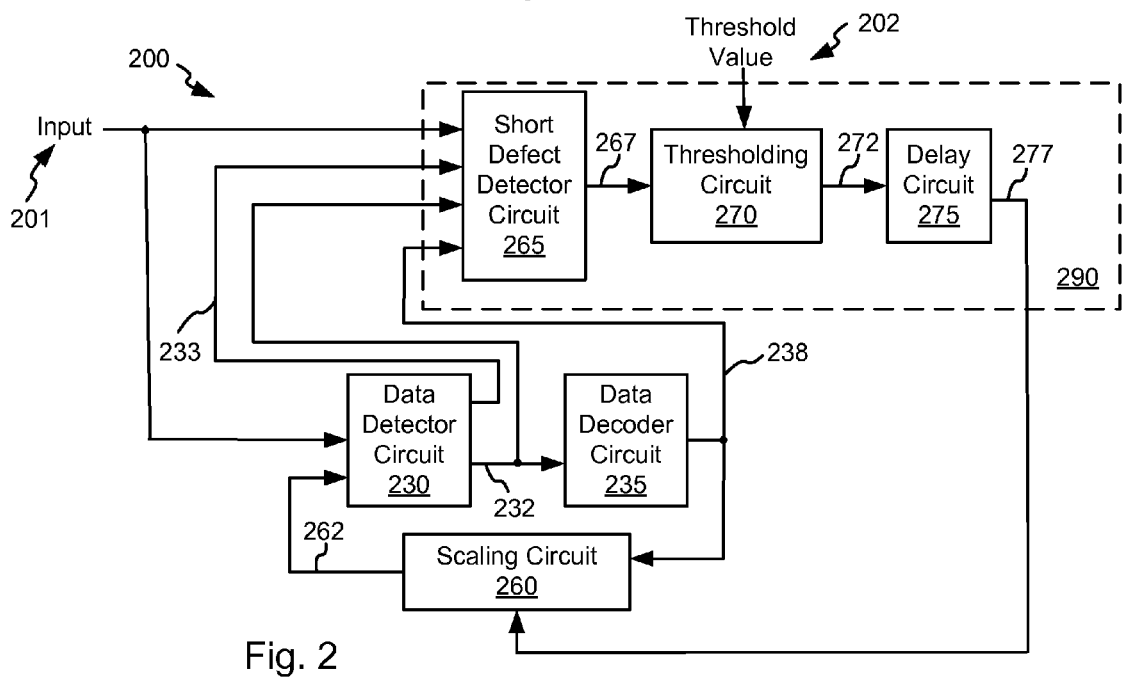
FIG. 2 depicts a short defect detector circuit in accordance with various embodiments of the present invention.

Turning to FIG. 2, a short defect detector circuit 200 is shown in accordance with various embodiments of the present invention. Short defect detector circuit 200 includes a data detector circuit 230 that receives a data input 201 and a scaled decoder soft output 262. Data input 201 may be, for example, a series of digital samples representing information sensed from a storage medium (not shown). In some embodiments of the present invention, data detector circuit 230 is a Viterbi algorithm data detector circuit. In other embodiments of the present invention, data detector circuit 230 is a maximum a posteriori data detector circuit. Based upon the disclosure provided herein, one of ordinary skill in the art will recognize a variety of data detector circuits that may be utilized in accordance with different embodiments of the present invention.

Data detector circuit 230 provides a detected output that includes an intrinsic soft output 233 and an extrinsic soft output 232. The intrinsic soft output is a probability of a particular bit state for a given bit period that is generated internal to data detector circuit 230. In some embodiments of the present invention, the intrinsic soft output is a log likelihood ratio. An extrinsic soft output is calculated based on the intrinsic soft output in accordance with the following equation:

Extrinsic Output=Intrinsic Output−a priori value, as is known in the art.

Extrinsic soft output 232 is provided to a data decoder circuit 235. In some embodiments of the present invention, data decoder circuit 235 is a low density parity check decoder circuit. Decoder circuit 235 applies a decoding algorithm to extrinsic soft output 232 to yield a decoder soft output 238. Decoder soft output 238 is fed back to data detector circuit 230 via a scaling circuit 260 as scaled decoder soft output 262. Scaling circuit 260 multiplies decoder soft output 238 by erasure flag 277 to yield scaled decoder soft output 262. Erasure flag 277 is set to zero when a media defect is identified. As such, scaling circuit 260 operates to cancel out decoder soft data 238 corresponding to a region where a defect is indicated. In this way, data derived from a defective region is discounted in the processes of detection and decoding, thus increasing the likelihood that the error correction capability of data detector circuit 230 and data decoder circuit 235 can converge on the originally written data set.

Figure 6:
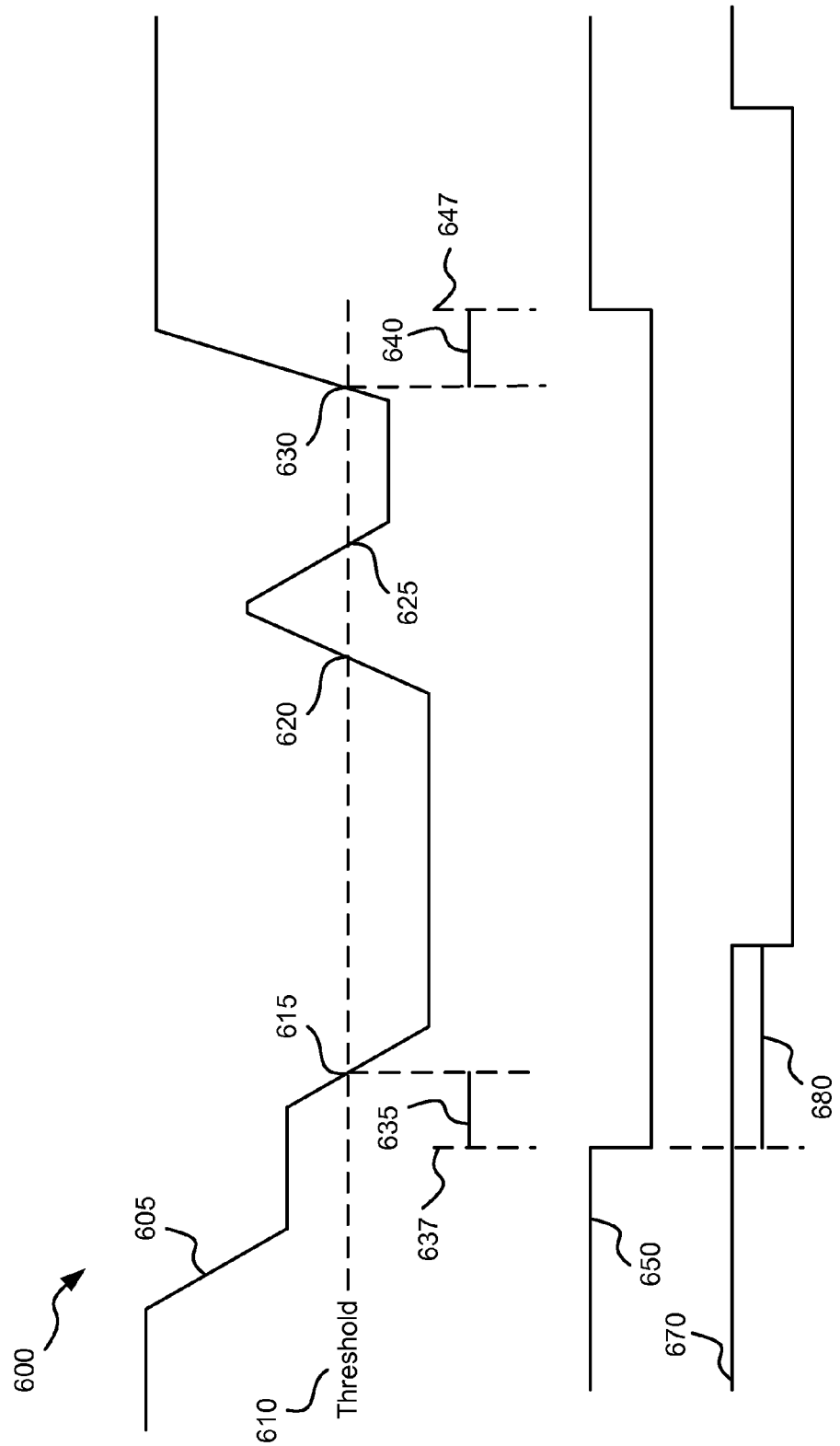
FIG. 6 is a timing diagram showing of an example of an assertion of the erasure flag beginning shortly before the location where the media defect is identified and extending until shortly after the media defect is identified.

Erasure flag 277 is provided from an erasure flag generation circuit 290 (shown in dashed lines). Erasure flag generation circuit 290 includes a short defect detector circuit 265 that calculates a combined correlation value 267 based upon input 201, extrinsic soft output 232, intrinsic soft output 233, and decoder soft output 238. Calculation of combined correlation value 267 is discussed more fully below in relation to FIG. 3. Combined correlation value 267 is provided to a thresholding circuit 270 where it is compared with a threshold value 202 to yield a preliminary erasure flag 272. Where combined correlation value 267 is less than threshold value 202, preliminary erasure flag 272 is asserted as a logic '0', otherwise preliminary erasure flag 272 is asserted as a logic '1'. Assertion of preliminary erasure flag 272 as a logic '0' indicates a media defect on the medium from which input 201 is derived. In some embodiments of the present invention, threshold value 202 is programmable. Preliminary erasure flag 272 is provided to a delay circuit 275 where it is delayed by a period. In addition, any logic '1' to logic '0' transition of preliminary erasure flag 272 is moved by delay circuit 275 back in time to assure that the resulting erasure flag 277 operates to cancel out data from shortly prior to the region of the medium identified as defective. Also, any logic '0' to logic '1' transition of preliminary erasure flag 272 is moved by delay circuit 275 forward in time to assure that the resulting erasure flag 277 operates to cancel out data from shortly after the region of the medium identified as defective. An example of such extension of the erasure flag around a detected media defect is depicted in FIG. 6 below.

Figure 3:
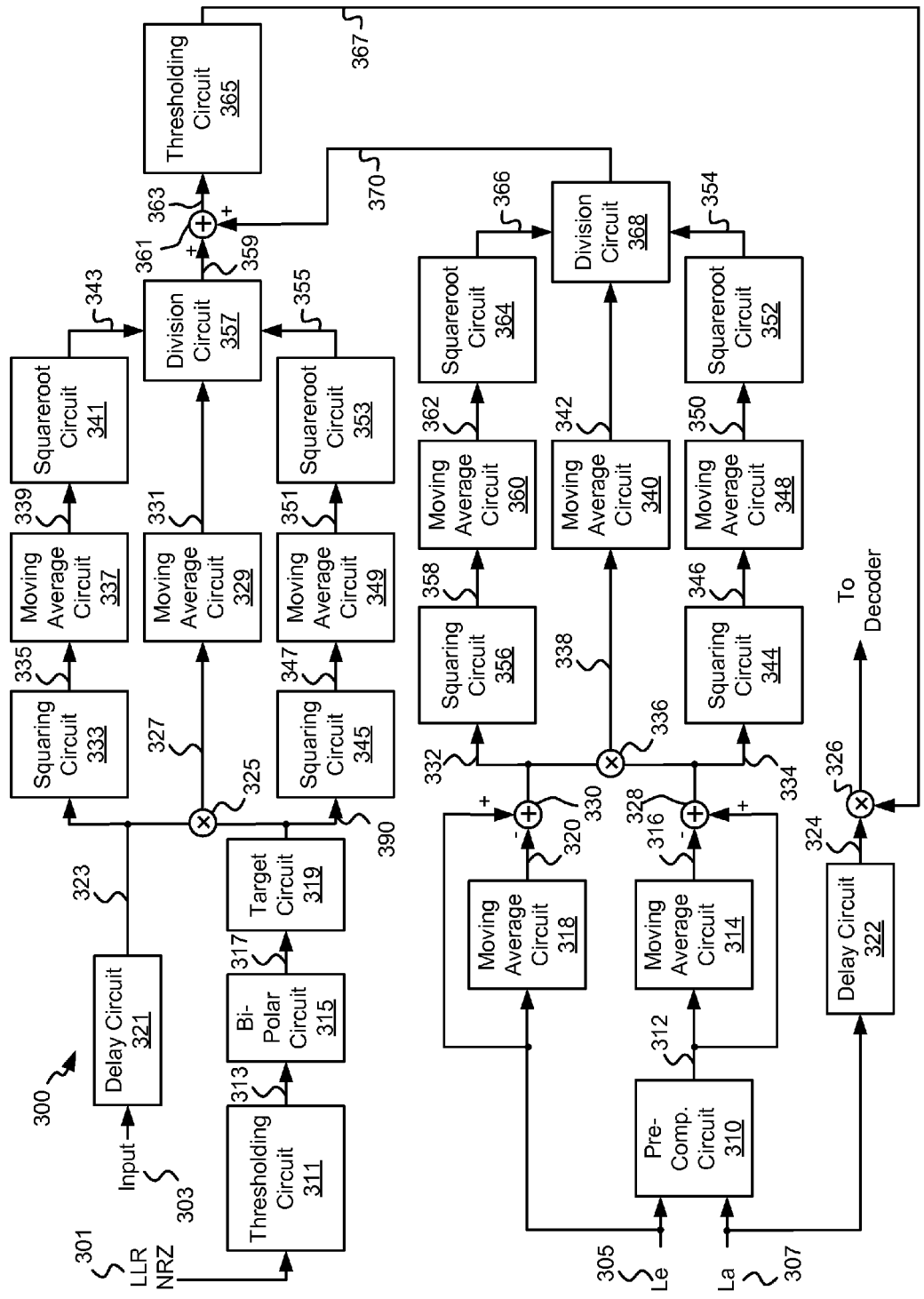
FIG. 3 shows one particular implementation of the short media defect detector circuit of FIG. 2 in accordance with some embodiments of the present invention.

Turning to FIG. 3, one particular implementation of the short media defect detector circuit of FIG. 2 is shown in accordance with some embodiments of the present invention. A short media defect detector circuit 300 includes a pre-compensation circuit 310 that receives a decoder soft output (La) 307 and a detector extrinsic soft output (Le) 305, and provides a pre-compensated data 312. Pre-compensation circuit 310 performs a pre-compensation in accordance with the following pseudocode:

```
If ([Decoder Soft Output 307 * Extrinsic Soft Output 305] > 0 &&
    Extrinsic Soft Output 305 > 10 &&
    Decoder Soft Output 307 10)
{
    Pre-compensated Data 312 = Extrinsic Soft Output 305
}
Else
{
    Pre-compensated Data 312 = 2* Decoder Soft Output 307
}
```

A moving average circuit 314 calculates a moving average of pre-compensated data 312 to yield a first moving average 316. In some embodiments of the present invention, moving average circuit 314 averages the sixteen most recent values of pre-compensated data 312. First moving average 316 is subtracted from the most current pre-compensated data 312 using a summation circuit 328 to yield a sum 334.

Sum 334 is squared by a squaring circuit 344 to yield a first product 346, and a moving average circuit 348 calculates a moving average of first product 346 to yield a third moving average 350. In some embodiments of the present invention, moving average circuit 348 averages the sixteen most recent values of first product 346. A square root circuit 352 calculates the square root of third moving average 350 to yield a first square root 354.

A moving average circuit 318 calculates a moving average of extrinsic soft output 305 to yield a second moving average 320. In some embodiments of the present invention, moving average circuit 318 averages the sixteen most recent values of extrinsic soft output 305. Second moving average 320 is subtracted from the most current extrinsic soft output 305 using a summation circuit 330 to yield a sum 332. A multiplier circuit 336 multiplies sum 332 by sum 334 to yield a second product 338. A moving average circuit 340 calculates a moving average of second product 338 to yield a fourth moving average 342. In some embodiments of the present invention, moving average circuit 340 averages the sixteen most recent values of second product 338.

Second sum 332 is squared by a squaring circuit 356 to yield a third product 358. A moving average circuit 360 calculates a moving average of third product 358 to yield a fifth moving average 362. In some embodiments of the present invention, moving average circuit 360 averages the sixteen most recent values of third product 358. A square root circuit 364 calculates the square root of fifth moving average 362 to yield a second square root 366. A division circuit 368 calculates a first correlation value 370 based upon the first square root 354, the second square root 366 and fourth moving average 342. In particular, division circuit 368 calculates first correlation 370 in accordance with the following equation:

$$\text{First Correlation 370} = \frac{\left[\frac{\text{Fourth Moving Average 342}}{\text{Second Square Root 366}}\right]}{\text{First Square Root 354}}.$$

A thresholding circuit 311 receives a detector intrinsic soft output (LLR NRZ) 301 and compares it against a threshold value. Where detector intrinsic soft output 301 is greater than the threshold value, a hard output 313 is asserted as a logic '1', otherwise hard output 313 is asserted as a logic '0'. A bi-polar circuit 315 converts hard output 313 to a bi-polar output 317. In particular, bi-polar output 317 is a value corresponding to a +1 whenever hard output 313 is a logic '1', and a −1 whenever hard output 313 is a logic '0'. Bi-polar output 317 is provided to a target circuit 319 that filters the received input using a partial response target to yield a filtered output 390. Target circuit 319 may be any partial response filter known in the art. Filtered output 390 is squared by a squaring circuit 345 to yield a fourth product 347, and a moving average circuit 349 calculates a moving average of fourth product 347 to yield a sixth moving average 351. In some embodiments of the present invention, moving average circuit 349 averages the sixteen most recent values of fourth product 347. A square root circuit 353 calculates the square root of sixth moving average 351 to yield a third square root 355.

An input 303 is delayed by a delay circuit 321 to align it with the corresponding detector intrinsic soft output 301 to yield a delayed output 323. A multiplier circuit 325 multiplies delayed output 323 by filtered output 390 to yield a fifth product 327. A moving average circuit 329 calculates a moving average of fifth product 327 to yield a seventh moving average 331. In some embodiments of the present invention, moving average circuit 329 averages the sixteen most recent values of fifth product 327.

Delayed output 323 is squared by a squaring circuit 333 to yield a sixth product 335. A moving average circuit 337 calculates a moving average of sixth product 335 to yield an eighth moving average 339. In some embodiments of the present invention, moving average circuit 337 averages the sixteen most recent values of sixth product 335. A square root circuit 341 calculates the square root of eighth moving average 339 to yield a fourth square root 343. A division circuit 357 calculates a second correlation value 359 based upon the third square root 355, the fourth square root 343, and seventh moving average 331. In particular, division circuit 357 calculates second correlation 359 in accordance with the following equation:

$$\text{Second Correlation 359} = \frac{\left[\frac{\text{Seventh Moving Average 331}}{\text{Fourth Square Root 343}}\right]}{\text{Third Square Root 355}}.$$

A summation circuit 361 adds the first correlation 370 to the second correlation 359 to yield a combined correlation 363. Combined correlation 363 is provided to a thresholding circuit 365 where it is compared to a threshold value. Where combined correlation 363 is less than the threshold value, an erasure flag 367 is asserted as a logic '0', otherwise erasure flag 367 is asserted as a logic '1'. Assertion of erasure flag 367 as a logic '0' indicates a media defect on the medium from which input 303 is derived. In some embodiments of the present invention, the threshold value is programmable. Erasure flag 367 s provided to a multiplier circuit 326. A delay circuit delays decoder soft output 307 to yield a delay decoder output 324. The amount of delay imposed by delay circuit 322 is sufficient to align erasure flag 367 with the corresponding decoder soft output 307. Multiplier 326 operates to zero out delayed data 324 that corresponds to a defective location on a medium as indicated by erasure flag 367, or passes delayed data on to the decoder (not shown) where no media defect is indicated by erasure flag 367.

Figure 4:
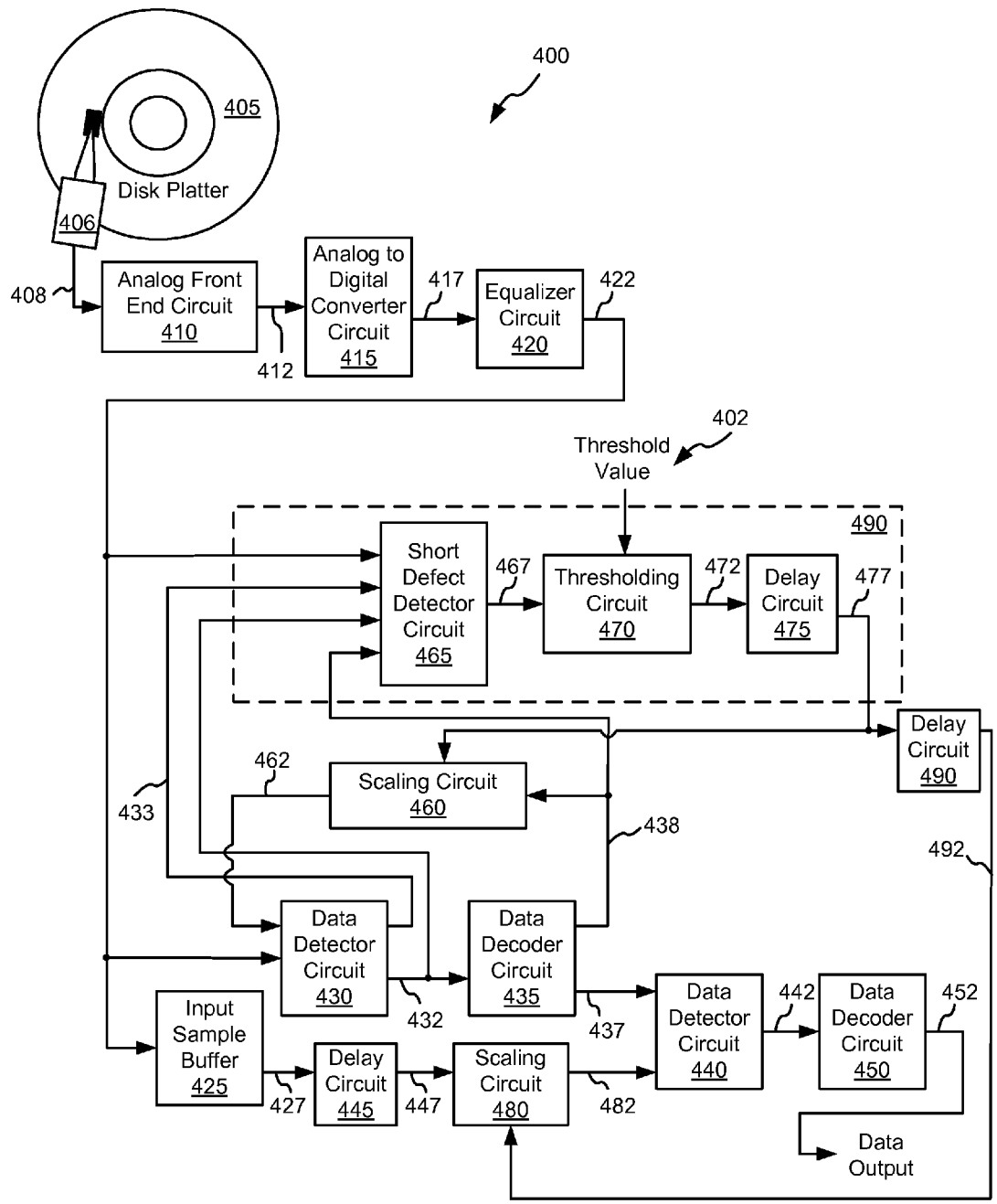
FIG. 4 depicts a data processing circuit including a short media defect detector circuit in accordance with various embodiments of the present invention.

Turning to FIG. 4, a data processing circuit 400 is shown that includes a short media defect detector circuit in accordance with various embodiments of the present invention. Data processing circuit 400 includes an analog front end circuit 410 that receives an analog signal 408 from a read/write head assembly 406 disposed in relation to a disk platter 405. Disk platter 405 stores information that may be sensed by read/write head assembly 406. Analog front end circuit 410 processes analog signal 408 and provides a processed analog signal 412 to an analog to digital converter circuit 420. Analog front end circuit 410 may include, but is not limited to, an analog filter and an amplifier circuit as are known in the art. Based upon the disclosure provided herein, one of ordinary skill in the art will recognize a variety of circuitry that may be included as part of analog front end circuit 410.

Analog to digital converter circuit 415 converts processed analog signal 412 into a corresponding series of digital samples 417. Analog to digital converter circuit 415 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 417 are provided to an equalizer circuit 420. Equalizer circuit 420 applies an equalization algorithm to digital samples 417 to yield an equalized output 422. In some embodiments of the present invention, equalizer circuit 420 is a digital finite impulse response filter circuit as are known in the art.

Equalized output 422 is provided to a data detector circuit 430, to an erasure flag generation circuit 490 (shown in dashed lines), and to an input sample buffer 425. Input sample buffer 425 may be any device or circuit known in the art that is capable of storing equalized output 422 for later stage data processing. Data detector circuit 430 receives equalized output 422 and a scaled decoder soft output 462. In some embodiments of the present invention, data detector circuit 430 is a Viterbi algorithm data detector circuit. In other embodiments of the present invention, data detector circuit 430 is a maximum a posteriori data detector circuit. Based upon the disclosure provided herein, one of ordinary skill in the art will recognize a variety of data detector circuits that may be utilized in accordance with different embodiments of the present invention.

Data detector circuit 430 provides a detected output that includes an intrinsic soft output 433 and an extrinsic soft output 432. The intrinsic soft output is a probability of a particular bit state for a given bit period that is generated internal to data detector circuit 430. In some embodiments of the present invention, the intrinsic soft output is a log likelihood ratio. An extrinsic soft output is calculated based on the intrinsic soft output in accordance with the following equation:

Extrinsic Output=Intrinsic Output−a priori value, as is known in the art.

Extrinsic soft output 432 is provided to a data decoder circuit 435. In some embodiments of the present invention, data decoder circuit 435 is a low density parity check decoder circuit. Decoder circuit 435 applies a decoding algorithm to extrinsic soft output 432 to yield a decoder soft output 438. Decoder soft output 438 is fed back to data detector circuit 430 via a scaling circuit 460 as scaled decoder soft output 462. Scaling circuit 460 multiplies decoder soft output 438 by erasure flag 477 to yield scaled decoder soft output 462. Erasure flag 477 is set to zero when a media defect is identified. As such, scaling circuit 460 operates to cancel out decoder soft data 438 corresponding to a region where a defect is indicated. In this way, data derived from a defective region is discounted in the processes of detection and decoding, thus increasing the likelihood that the error correction capability of data detector circuit 430 and data decoder circuit 435 can converge on the originally written data set.

In addition, data decoder circuit 435 provides a decoder output 437 to the next data processing stage that includes both a data detector circuit 440 and a data decoder circuit 450. In some embodiments of the present invention, data detector circuit 440 is a Viterbi algorithm data detector circuit. In other embodiments of the present invention, data detector circuit 440 is a maximum a posteriori data detector circuit. Based upon the disclosure provided herein, one of ordinary skill in the art will recognize a variety of data detector circuits that may be utilized in accordance with different embodiments of the present invention. In some embodiments of the present invention, data decoder circuit 435 is a low density parity check decoder circuit. Based upon the disclosure provided herein, one of ordinary skill in the art will recognize a variety of data decoder circuits that may be utilized in accordance with different embodiments of the present invention.

In addition, data detector circuit 440 receives a scaled decoder output 482 and applies a data detection algorithm to yield a detected output 442. Scaled input 482 is derived from a sample output 427 from input sample buffer 425. In particular, sample output is delayed through a delay circuit 445 to yield a delay output 447. The imposed delay corresponds to the latency of processing through data detector circuit 430 and data decoder circuit 435 including any additional iterations through data detector circuit 430 and data decoder circuit 435. Delayed output 447 is aligned in time with decoder output 437. Delayed output 447 is provided to a scaling circuit 480. Scaling circuit 480 multiplies decoder output 437 by a delayed erasure flag 492 to yield scaled decoder output 482. Delayed erasure flag 492 is erasure flag 477 after passing through a delay circuit 490 that imposes a delay that corresponds to the delay of delay circuit 445. Delayed erasure flag 492 is set to zero when a media defect is identified. As such, scaling circuit 480 operates to cancel out the input data derived from input sample buffer 425 corresponding to a region where a defect is indicated. In this way, data derived from a defective region is discounted in the processes of detection and decoding, thus increasing the likelihood that the error correction capability of data detector circuit 440 and data decoder circuit 445 can converge on the originally written data set.

Erasure flag 477 is provided from an erasure flag generation circuit 490 (shown in dashed lines). Erasure flag generation circuit 490 includes a short defect detector circuit 465 that calculates a combined correlation value 467 based upon equalized output 422, extrinsic soft output 432, intrinsic soft output 433, and decoder soft output 438. Calculation of combined correlation value 467 may be done similar to that discussed above in relation to FIG. 3. Combined correlation value 467 is provided to a thresholding circuit 470 where it is compared with a threshold value 402 to yield a preliminary erasure flag 472. Where combined correlation value 467 is less than threshold value 402, preliminary erasure flag 472 is asserted as a logic '0', otherwise preliminary erasure flag 472 is asserted as a logic '1'. Assertion of preliminary erasure flag 472 as a logic '0' indicates a media defect on the medium from which equalized output 422 is derived. In some embodiments of the present invention, threshold value 402 is programmable. Preliminary erasure flag 472 is provided to a delay circuit 475 where it is delayed by a period. In addition, any logic '1' to logic '0' transition of preliminary erasure flag 472 is moved by delay circuit 475 back in time to assure that the resulting erasure flag 477 operates to cancel out data from shortly prior to the region of the medium identified as defective. Also, any logic '0' to logic '1' transition of preliminary erasure flag 472 is moved by delay circuit 475 forward in time to assure that the resulting erasure flag 477 operates to cancel out data from shortly after the region of the medium identified as defective. An example of such extension of the erasure flag around a detected media defect is depicted in FIG. 6 below.

Figure 5A:
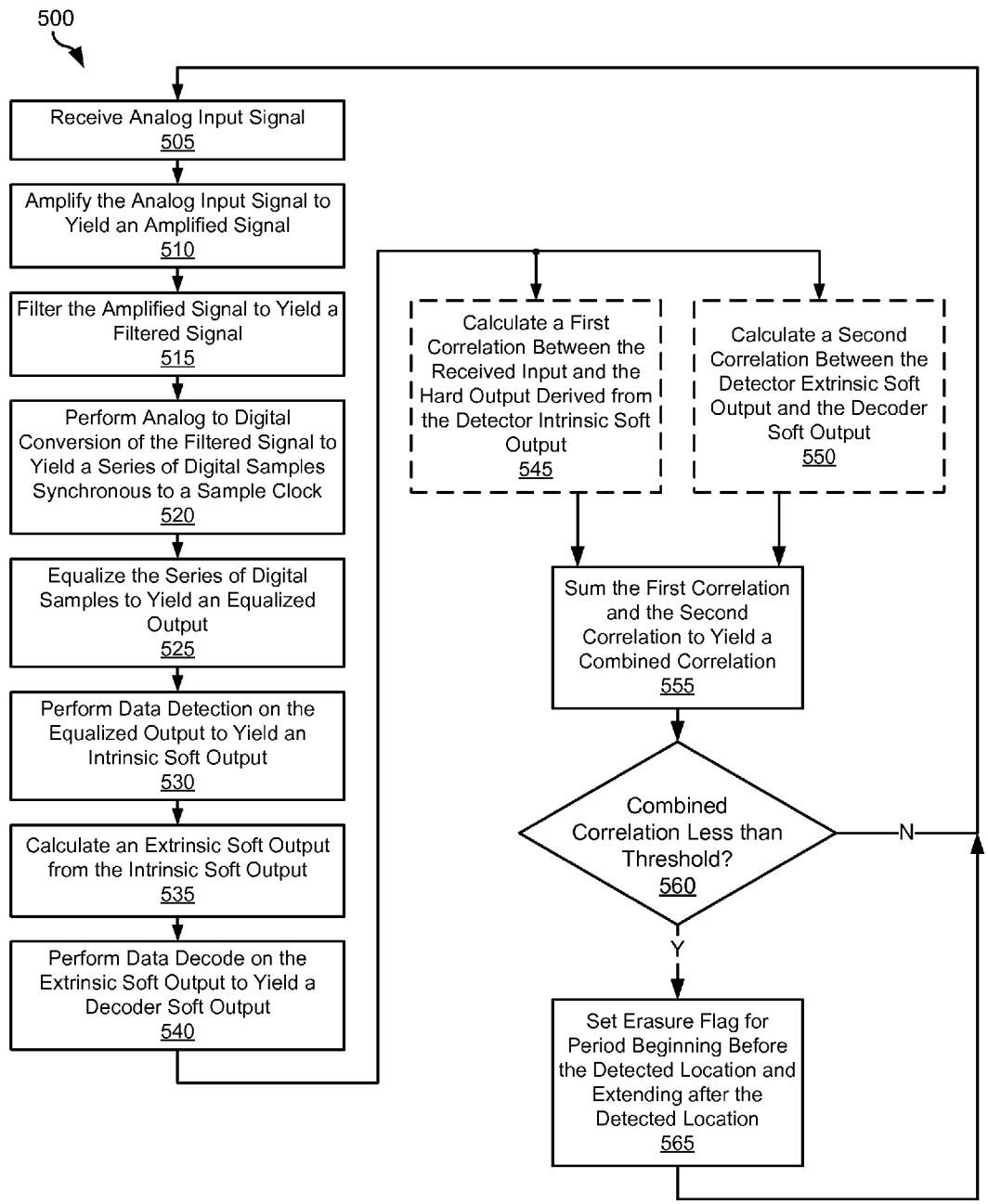
FIGS. 5a-5c show a method in accordance with some embodiments of the present invention for performing short media defect detection.
Figure 5B:
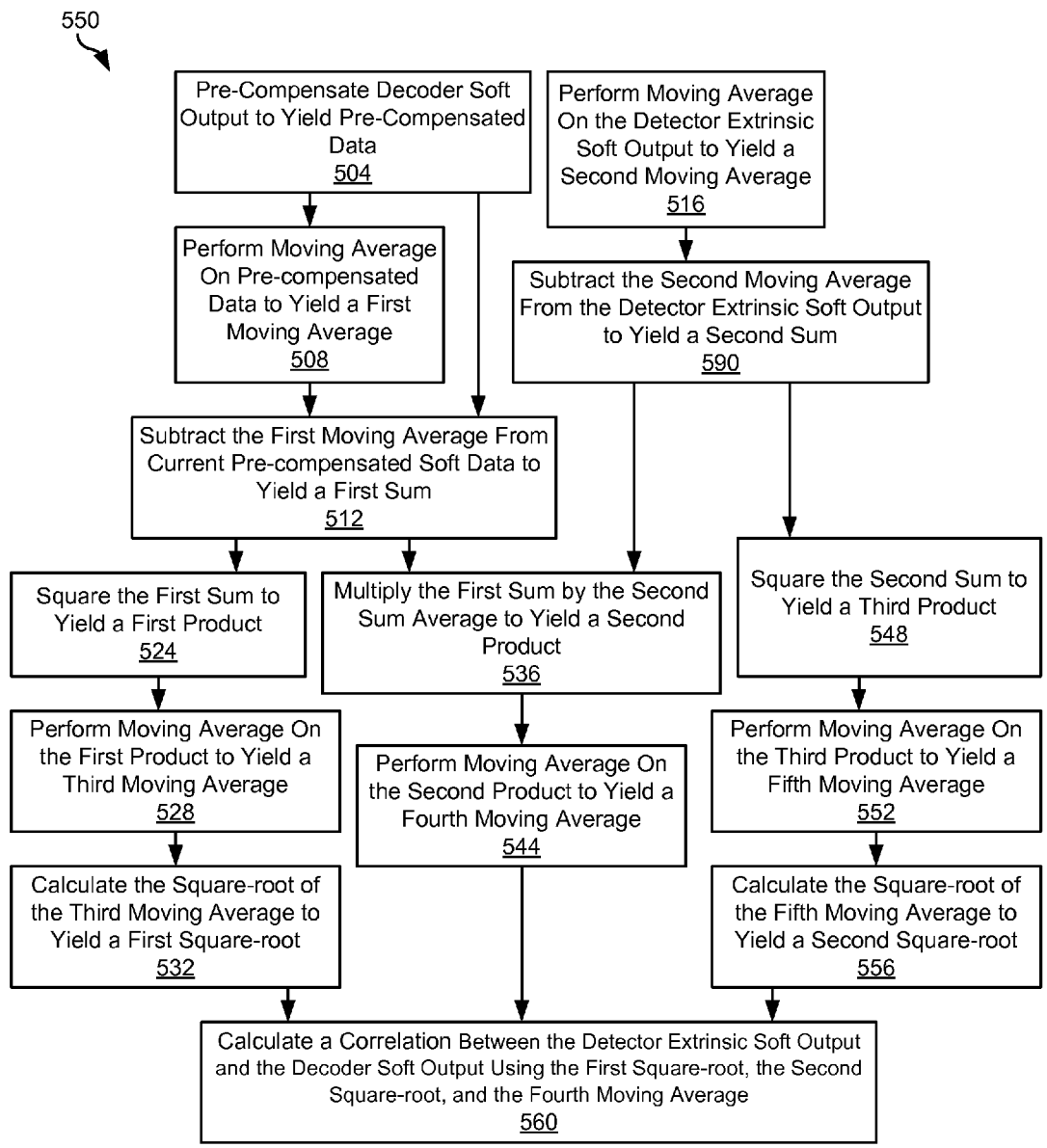
Figure 5C:
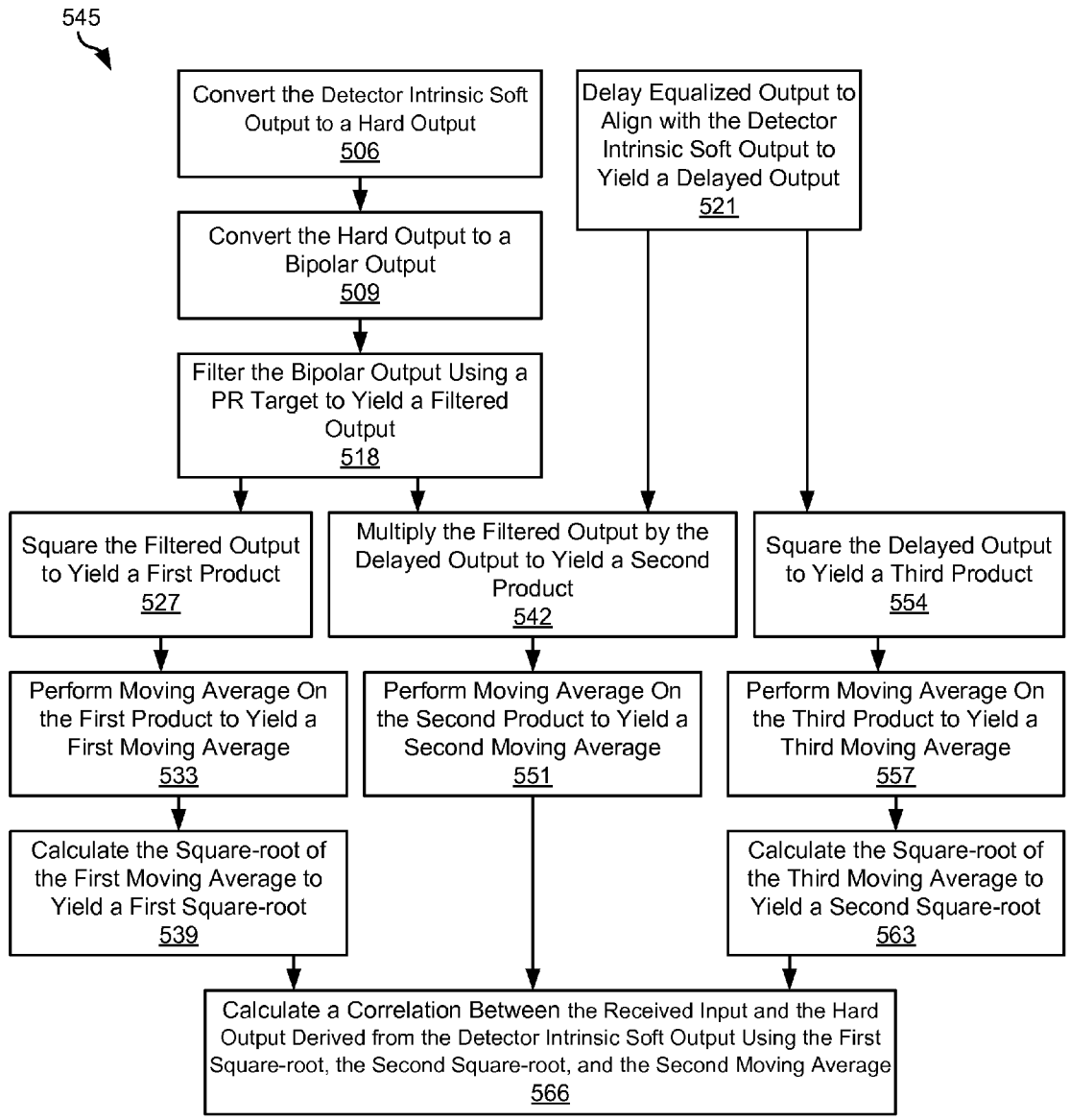

Turning to FIGS. 5a-5c, a method is depicted in accordance with some embodiments of the present invention for performing short media defect detection. Starting with FIG. 5a, a flow diagram 500 shows the broad implementation of the method. Following flow diagram 500, an analog input signal is received (block 505). Analog input signal includes various information including synchronization information, user data, servo data and the like that is derived from a medium. The medium may be, but is not limited to, a magnetic storage medium. The analog input signal may be received, for example, from a read/write head assembly that senses information from a storage medium or from a receiver that receives information from some other type of medium. Based upon the disclosure provided herein, one of ordinary skill in the art will recognize a variety of sources of the analog input signal. The analog input signal is amplified to yield an amplified signal (block 510), and the amplified signal is filtered to yield a filtered signal (block 515). The aforementioned amplification and filtering may be done in either order, and may be done by an analog front end circuit as are known in the art. An analog to digital conversion process is applied to the filtered output to yield a series of corresponding digital samples (block 520). The series of digital samples are synchronous to a sampling clock, and represent a value of the analog input signal at each particular sampling instant. Based upon the disclosure provided herein, one of ordinary skill in the art will recognize a variety of analog to digital conversion processes that may be applied in accordance with different embodiments of the present invention. The series of digital samples are equalized to yield an equalized output (block 525). In some embodiments of the present invention, the equalization process is done using a digital finite impulse response filter circuit as are known in the art. Based upon the disclosure provided herein, one of ordinary skill in the art will recognize a variety of equalizer circuits and/or equalization processes that may be used in relation to different embodiments of the present invention.

A data detection process is applied to the equalized output to yield an intrinsic soft output (block 530). In some embodiments of the present invention, the data detection process is a Viterbi algorithm data detection process. In other embodiments of the present invention, the data detection process is a maximum a posteriori data detection process. Based upon the disclosure provided herein, one of ordinary skill in the art will recognize a variety of data detection processes that may be applied in accordance with different embodiments of the present invention. The intrinsic soft output is a probability of a particular bit state for a given bit period that is generated internal to the data detection process. In some embodiments of the present invention, the intrinsic soft output is a log likelihood ratio. An extrinsic soft output is calculated based on the intrinsic soft output (block 535). In particular, the extrinsic soft output is calculated in accordance with the following equation:

Extrinsic Output=Intrinsic Output−a priori value, as is known in the art.

A data decoding process is performed on the extrinsic soft output to yield a decoder soft output (block 540). In some embodiments of the present invention, the data decoding process is a low density parity check process. Based upon the disclosure provided herein, one of ordinary skill in the art will recognize a variety of data decoding processes that may be applied in accordance with different embodiments of the present invention.

A first correlation between the received input and a hard output derived from the detector intrinsic soft output is calculated (block 545). Detail about the aforementioned calculated correlation is discussed below in relation to FIG. 5c. In addition, a second correlation between the detector extrinsic output and the decoder soft output is calculated (block 550). Detail about the aforementioned calculated correlation is discussed below in relation to FIG. 5b. The first correlation is added to the second correlation to yield a combined correlation (block 555). The combined correlation is then compared with a threshold to determine whether it is less than the threshold (block 560). In some embodiments of the present invention, the threshold is programmable, while in other embodiments of the present invention, the threshold is fixed. In one particular embodiment of the present invention, the threshold is fixed at a value of 0.6. Where the combined correlation is not less than the threshold (block 560), no media defect is identified and the processes of blocks 505-560 are repeated for the next received data. Alternatively, where the combined correlation is less than the threshold (block 560), a media defect is considered to have been identified. As such, an erasure flag is set for a period beginning shortly before the location where the media defect is identified and extending until shortly after the media defect is identified (block 565).

Turning to FIG. 5b, a flow diagram 550 depicts the details of the block of the same number from flow diagram 500. Following flow diagram 550, the decoder soft output is pre-compensated to yield pre-compensated data (block 504). In one particular embodiment of the present invention, the pre-compensated data is calculated in accordance with the following pseudocode:

```
If ([Decoder Soft Output * Extrinsic Soft Output] > 0 &&
    Extrinsic Soft Output > 10 &&
    Decoder Soft Output > 10)
{
    Pre-compensated Data = Extrinsic Soft Output
}
Else
{
    Pre-compensated Data = 2* Decoder Soft Output
}
```

A moving average of the pre-compensated data is calculated to yield a first moving average (block 508). In some embodiments of the present invention, the moving average is an average of the sixteen most recent values of pre-compensated data. The first moving average is subtracted from the most current pre-compensated data to yield a first sum (block 512).

The first sum is squared to yield a first product (block 524), and a moving average is performed on the first product to yield a third moving average (block 528). In some embodiments of the present invention, the moving average is an average of the sixteen most recent values of the first product. A square root of the third moving average is then calculated to yield a first square root (block 532).

A moving average is also done on the detector extrinsic soft output to yield a second moving average (block 516). In some embodiments of the present invention, the moving average is an average of the sixteen most recent values of extrinsic soft output. The second moving average is subtracted from the most recent value of the detector extrinsic soft output to yield a second sum (block 590). The second sum is multiplied by the first sum to yield a second product (block 536), and a moving average is performed on the second product to yield a fourth moving average (block 544). In some embodiments of the present invention, the moving average is an average of the sixteen most recent values of the second product.

The second sum is squared to yield a third product (block 548), and a moving average is performed on the third product to yield a fifth moving average (block 552). In some embodiments of the present invention, the moving average is an average of the sixteen most recent values of the third product. A square root of the fifth moving average is then calculated to yield a second square root (block 556). A correlation between the detector extrinsic soft output and the decoder soft output is calculated using the first square-root, the second square-root, and the fourth moving average (block 560). In particular, the correlation is calculated in accordance with the following equation:

$$\text{Correlation} = [(\text{The Fourth Moving Average})/(\text{The First Square Root})]/(\text{The Second Square Root}).$$

Turning to FIG. 5c, a flow diagram 545 depicts the details of the block of the same number from flow diagram 500. Following flow diagram 545, the detector intrinsic soft output is converted to a hard output (block 506). This may be done, for example by comparing the detector intrinsic soft output to a threshold value. Where the detector intrinsic soft output is greater than the threshold value, it is replaced by a logic '1', otherwise it is replaced by a logic '0'. The hard output is converted to a bipolar output (block 509). This process includes replacing logic '1's with a value corresponding to +1, and replacing logic '0's with a value corresponding to -1. The bipolar output is then filtered using a partial response target to yield a filtered output (block 518). The partial response filtering may be done using any partial response filter known in the art. The filtered output is squared to yield a first product (block 527), and a moving average is performed on the first product to yield a first moving average (block 533). In some embodiments of the present invention, the moving average is an average of the sixteen most recent values of the first product. A square root of the first moving average is then calculated to yield a first square root (block 539).

The equalized output is delayed to align it with the detector intrinsic soft output to yield a delayed output (block 521). The delayed output is multiplied by the filtered output to yield a second product (block 542). A moving average is performed on the second product to yield a second moving average (block 551). In some embodiments of the present invention, the moving average is an average of the sixteen most recent values of the second product.

The delayed output is squared to yield a third product (block 554), and a moving average is performed on the third product to yield a third moving average (block 557). In some embodiments of the present invention, the moving average is an average of the sixteen most recent values of the third product. A square root of the third moving average is then calculated to yield a second square root (block 563). A correlation between the Received Input and the hard output derived from the detector intrinsic soft output using the first square root, the second square root, and the second moving average (block 566). In particular, the correlation is calculated in accordance with the following equation:

$$\text{Correlation} = [(\text{The Second Moving Average})/(\text{The Second Square Root})]/(\text{The First Square Root}).$$

Turning to FIG. 6, a timing diagram 600 shows an example of an assertion of the erasure flag beginning shortly before the location where the media defect is identified and extending until shortly after the media defect is identified. Timing diagram 600 shows an example waveform of a combined correlation value 605 in relation to an ideal erasure flag 650 and a delayed erasure flag 670. As shown, when combined correlation value 605 drops below a threshold value 610, ideal erasure flag 650 is asserted at a point 637 a predetermined period 635 prior to a point 615 where combined correlation value 605 drops below threshold 610. As it is not possible to assert a signal in the past, a delayed erasure flag 670 is generated that is delayed by a period 680. Of note, period 680 is greater than or equal to period 635. Period 680 is implemented by delay circuit 322 of FIG. 3 that was described above.

Ideal erasure flag 650 is de-asserted at a point 647 a predetermined period 640 after a point 630 where combined correlation value 605 exceeds threshold 610. Again, delayed erasure flag 670 is de-asserted at a point delayed by period 680. Of note, there is no transition of delay erasure flag 670 corresponding to the transitions of combined correlation value 605 passing through threshold value 610 at points 620, 625. This occurs because the time during which combined correlation value 605 exceeds threshold value 610 is less than period 635 plus period 640.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for performing defect detection. While detailed descriptions of one or more embodiments of the invention have been given above, various alternatives, modifications, and equivalents will be apparent to those skilled in the art without varying from the spirit of the invention. For example, one or more embodiments of the present invention may be applied to various data storage systems and digital communication systems, such as, for example, tape recording systems, optical disk drives, wireless systems, and digital subscriber line systems. Therefore, the above description should not be taken as limiting the scope of the invention, which is defined by the appended claims.

What is claimed is:

1. A data processing circuit, the data processing circuit comprising:
   a defect detector circuit operable to calculate a correlation value by combining at least three of a data input derived from a medium, a detector extrinsic output, a detector intrinsic output and a decoder output; and a comparator circuit operable to compare the correlation value to a threshold value and to assert a media defect indicator when the correlation value is less than the threshold value.

2. The data processing circuit of claim 1, wherein the data processing circuit further comprises:
a data detector circuit operable to apply a data detection algorithm to the data input and a derivative of the decoder output to yield the detector intrinsic output and the detector extrinsic output.

3. The data processing circuit of claim 2, wherein the data processing circuit further comprises:
a scaling circuit operable to multiply the media defect indicator by the decoder output to yield the derivative of the decoder output.

4. The data processing circuit of claim 1, wherein the data processing circuit further comprises:
a data decoder circuit operable to apply a data decoding algorithm to the detector extrinsic output to yield the decoder output.

5. The data processing circuit of claim 1 wherein the data detector circuit is further operable to calculate the correlation value by combining all of the data input, the detector extrinsic output, the detector intrinsic output and the decoder output.

6. The data processing circuit of claim 5, wherein correlating all of the data input, the detector extrinsic output, the detector intrinsic output and the decoder output to yield the correlation value comprises:
calculating a first preliminary value based on the detector intrinsic output and the data input;
calculating a second preliminary value based on the detector extrinsic output and the decoder output; and
summing the first preliminary value and the second preliminary value to yield the correlation value.

7. The data processing circuit of claim 1, wherein the data processing circuit is implemented as an integrated circuit.

8. The data processing circuit of claim 1, wherein the data processing circuit is incorporated in a storage device.

9. A method for detecting media defects, the method comprising:
receiving a data input derived from a medium;
receiving a detector extrinsic output derived from the data input;
receiving a detector intrinsic output derived from the data input;
receiving a decoder output derived from the data input;
correlating at least three of the data input, the detector extrinsic output, the detector intrinsic output, and the decoder output to yield a correlation value; and
asserting a media defect indicator based at least in part on the correlation value.

10. The method of claim 9, the method further comprising:
comparing the correlation value with a threshold value, wherein asserting the media defect indicator is done when the correlation value is less than the threshold value.

11. The method of claim 10, wherein the threshold value is programmable.

12. The method of claim 9, wherein correlating at least three of the data input, the detector extrinsic output, the detector intrinsic output and the decoder output to yield the correlation value includes correlating all of the data input, the detector extrinsic output, the detector intrinsic output and the decoder output to yield the correlation value.

13. The method of claim 12, wherein correlating all of the data input, the detector extrinsic output, the detector intrinsic output and the decoder output to yield the correlation value comprises:
calculating a first preliminary value based on the detector intrinsic output and the data input;
calculating a second preliminary value based on the detector extrinsic output and the decoder output; and
summing the first preliminary value and the second preliminary value to yield the correlation value.

14. The method of claim 13, wherein calculating the first preliminary value comprises:
converting the detector intrinsic output to a data output;
filtering the data output to yield a filtered output;
squaring the filtered output to yield a first product;
averaging a number of instances of the first product to yield a first averaged output;
calculating a square root of the first averaged output to yield a first square root;
aligning the data input with the corresponding filtered output to yield an aligned output;
multiplying the filtered output by the aligned output to yield a second product;
averaging a number of instances of the second product to yield a second averaged output;
squaring the aligned output to yield a third product;
averaging a number of instances of the third product to yield a third averaged output;
calculating a square root of the third averaged output to yield a second square root; and
calculating the first preliminary value by dividing the second averaged output by the first square root and the second square root.

15. The method of claim 13, wherein calculating the second preliminary value comprises:
providing a derivative of the decoder output;
averaging a number of instances of the derivative of the decoder output to yield a first averaged output;
subtract the first averaged output from the derivative of the decoder output to yield a first sum;
averaging a number of instances of the detector extrinsic output to yield a second averaged output;
subtract the second averaged output to yield a second sum;
squaring the first sum to yield a first product;
averaging a number of instances of the first product to yield a third averaged output;
calculating a square root of the third averaged output to yield a first square root;
multiplying the first sum by the second sum to yield a second product;
averaging a number of instances of the second product to yield a fourth averaged output;
squaring the second sum to yield a third product;
averaging a number of instances of the third product to yield a fifth averaged output;
calculating a square root of the fifth averaged output to yield a second square root; and
calculating the second preliminary value by dividing the fourth averaged output by the first square root and the second square root.

16. The method of claim 15, wherein providing the derivative of the decoder output comprises:
pre-compensating the decoder output to yield the derivative of the decoder output, wherein pre-compensating the decoder output includes:
comparing the decoder output with a threshold value;

setting the derivative of the decoder output to the detector extrinsic output where the decoder output is greater than the threshold value; and setting the derivative of the decoder output to two times the decoder output where the decoder output is less than the threshold value.

17. The method of claim 9, wherein the method further comprises:

performing a data detection on the data input and a derivative of the decoder output to yield the detector intrinsic output and the detector extrinsic output.

18. The method of claim 17, wherein the method further comprises:

multiplying the decoder output by the media defect indicator to yield the derivative of the decoder output.

19. The method of claim 9, wherein the method further comprises:

performing a data decode of the detector extrinsic output to yield the decoder output.

20. A storage device, the storage device comprising:

a storage medium;

a read/write head assembly operable to sense information from the storage medium and to provide a corresponding continuous signal;

an analog front end circuit operable to process the continuous signal to yield an analog input;

an analog to digital converter circuit operable to sample the analog input synchronous to a sampling clock to yield a set of digital samples;

an equalizer circuit operable to equalize the set of digital samples and to provide a corresponding equalized output;

a data detector circuit operable to apply a data detection algorithm to the equalized output and a derivative of a decoder output to yield a detector intrinsic output and a detector extrinsic output;

a data decoder circuit operable to apply a data decoding algorithm to the detector extrinsic output to yield the decoder output;

a defect detector circuit operable to calculate a correlation value by combining at least three of the equalized output, the detector extrinsic output, the detector intrinsic output, and the decoder output;

a comparator circuit operable to compare the correlation value to a threshold value and to assert a media defect indicator when the correlation value is less than the threshold value; and a scaling circuit operable to multiply the media defect indicator by the decoder output to yield the derivative of the decoder output.

\* \* \* \* \*